United States Patent
Fiedler et al.

(10) Patent No.: US 8,636,413 B2
(45) Date of Patent: Jan. 28, 2014

(54) ROTARY BEARING ARRANGEMENT

(75) Inventors: Max Fiedler, Kornwestheim (DE); Jan Patrick Häntsche, Karlsruhe (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 255 days.

(21) Appl. No.: 13/007,027

(22) Filed: Jan. 14, 2011

(65) Prior Publication Data

US 2011/0274379 A1 Nov. 10, 2011

(30) Foreign Application Priority Data

Jan. 18, 2010 (DE) .................... 10 2010 004 870

(51) Int. Cl.
*F16C 27/00* (2006.01)

(52) U.S. Cl.
USPC ........................................ 384/99; 384/535

(58) Field of Classification Search
USPC ..................... 384/99, 535, 536, 581, 582
See application file for complete search history.

(56) References Cited

U.S. PATENT DOCUMENTS

| | | | |
|---|---|---|---|
| 2,860,827 A * | 11/1958 | Egli | ................ 417/407 |
| 3,382,017 A | 5/1968 | Cripe | |
| 4,306,755 A | 12/1981 | Roberts | |
| 4,721,441 A | 1/1988 | Miyashita et al. | |
| 5,099,966 A | 3/1992 | Wohrl | |
| 7,431,504 B1 | 10/2008 | Pelfrey | |
| 7,517,152 B1 * | 4/2009 | Walsh | ................ 384/99 |
| 7,553,123 B2 * | 6/2009 | Casaro | ................ 384/536 |
| 2007/0147717 A1 | 6/2007 | Kusano et al. | |
| 2009/0110572 A1 * | 4/2009 | Meacham et al. | ................ 384/428 |

FOREIGN PATENT DOCUMENTS

| | | |
|---|---|---|
| CH | 444585 A | 9/1967 |
| DE | 3013034 A1 | 10/1980 |
| DE | 3531313 A1 | 3/1986 |
| DE | 238426 | 8/1986 |
| DE | 19622249 A1 | 12/1996 |
| DE | 202006008365 U1 | 8/2006 |
| DE | 602004008514 T2 | 5/2008 |
| DE | 102007049442 A1 | 4/2009 |
| DE | 102008049861 B3 | 6/2010 |
| EP | 0430083 A1 | 6/1991 |
| JP | 11082498 A * | 3/1999 |
| JP | 11151545 A | 6/1999 |
| JP | 2003-56560 A | 9/2004 |

OTHER PUBLICATIONS

English abstract for DE-102007049442.
English abstract for DE-19622249.
English abstract for DE-202006008365.
German Search Report for DE-102010004870.4.

* cited by examiner

*Primary Examiner* — Thomas R Hannon
(74) *Attorney, Agent, or Firm* — Rader, Fishman & Grauer PLLC

(57) ABSTRACT

A rotary bearing that includes an inner race and an outer race the races are configured between a rotor and a housing body. At least one of the outer race and a mounting surrounding an outer race sleeve is at least one of clamped and fixed in a predetermined position on the housing body by at least one of a holding device and a locking device of a material damping structure.

20 Claims, 4 Drawing Sheets

ROTARY BEARING ARRANGEMENT

Figure 1:
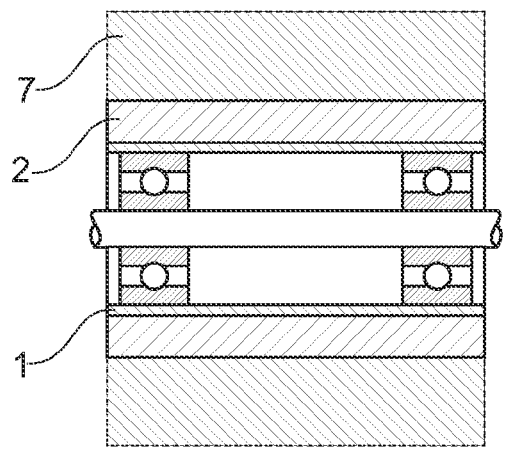

The invention relates to a rotary bearing arrangement with inner and outer race between a rotor or the like and a housing body, particularly between rotor shaft and housing body of a turbocharger.

EP 0 430 083 B1 for example shows the arrangement of a rolling bearing for the rotary mounting of a shaft or of a turbine. There, the inner race of the rolling bearing is arranged on the shaft in a fixed manner, while the outer race is enclosed by a sleeve-like cage. This sleeve-like cage is arranged in a corresponding bore of a housing body subject to the interposition of a so-called oil pressure film, wherein the sleeve-like cage is clamped in a desired position by spring bars which are arranged parallel to the bearing axis between a face edge of the cage and a housing body part. The oil pressure gap between the outer circumference of the bearing sleeve and the inner circumference of the housing bore accommodating the bearing arrangement is sealed through pressure seals which are spaced from each other in axial direction of the bearing arrangement and can be supplied with pressure oil via a housing bore. Through the oil pressure film present in the oil pressure gap, damping of vibrations which can be excited by unbalances of the rotating masses or unavoidable tolerances of the rolling bearing elements, is made possible.

Despite the decoupling of the rolling bearing from the housing body in terms of vibration, a transmission of structure-borne vibration between the rotating masses and the housing body cannot be sustainably avoided with this known rotary bearing arrangement because the spring bars between the bearing sleeve and the housing body act as highly conductive sound bridges.

With respect to the avoiding of structure-borne vibration transmission slide bearings are advantageous in principle since through the lubricant film between inner and outer race present in operation a comparatively effective interruption of the sound path between rotating masses and housing body is achieved.

On the other hand, slide bearings have the fundamental disadvantage that the lubricant film particularly in the starting phase of a machine is not present with the desirable load-bearing capacity so that increased wear with increased noise level must be expected.

It is therefore the object of the invention to create a rotary bearing arrangement which, independently of the use of rolling or slide bearings, securely avoids transmission of structure-borne vibration between rotating masses and housing body.

According to the invention, this object is solved in that the outer race or a mounting enclosing said outer race in the manner of a sleeve is clamped into a desired position and/or fixed on the housing body in the desired position by means of a holding device of a material damping structure-borne vibrations, in particular it is provided according to the invention to fix or hold in a desired position a mounting of a rotary bearing within a housing body by means of a holding device damping structure-borne vibration.

The invention is based on the realization that the safeguards against "migrating" of the outer race particularly required with rolling bearings acoustically act as sound bridges for the transmission of structure-borne vibration between rotating masses and housing bodies. In this connection, the invention realizes the general idea of designing the mechanical connecting path between rotary bearing and housing body present because of the aforementioned safeguards so that in the sound path material with favorable damping characteristics against structure-borne vibration is arranged.

If between the mounting of the outer race and the housing body in the manner of the invention a holding device designed as structure-borne vibration barrier is arranged, it can be easily provided according to a preferred embodiment of the invention that the mounting encloses the outer race subject to the interposition of an oil pressure gap. Here, no special constructive measures whatsoever have to be provided for this oil pressure gap. The holding device provided as structure-borne vibration barrier can, according to a practical embodiment, be designed as double-wall tube with connections, particularly ribs, arranged between these walls and on the inner circumference of the inner wall be connected in a fixed manner to the outer race or its mounting.

The connections can be designed as spokes or ribs or as gel or foam-like bodies.

As for the rest, reference with regard of preferred features of the invention is made to the claims and the following explanation of the drawing by means of which particularly advantageous embodiments of the invention are described in more detail.

Protection is not only claimed for feature combinations stated or presented but also for principally any combinations of the individual features stated or presented.

In the drawing it shows

Figure 2:
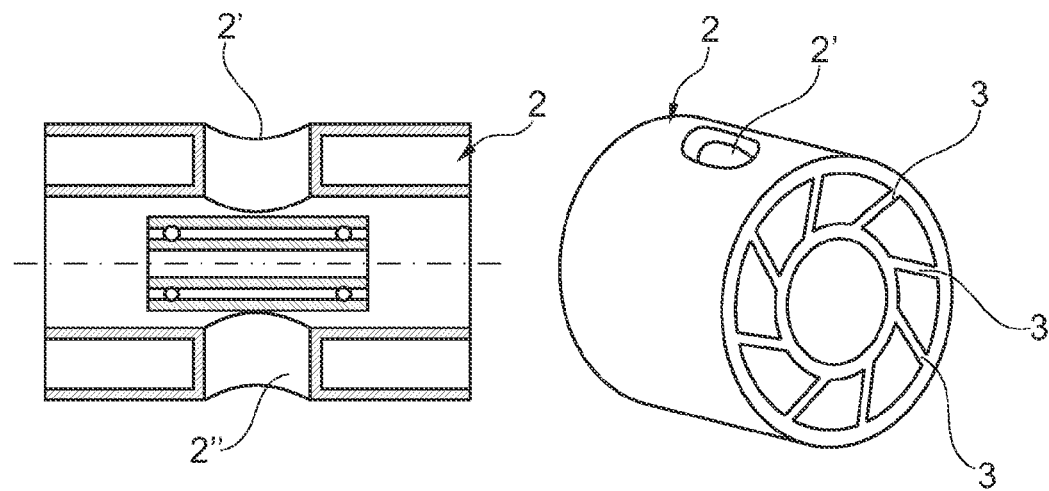
Figure 3:
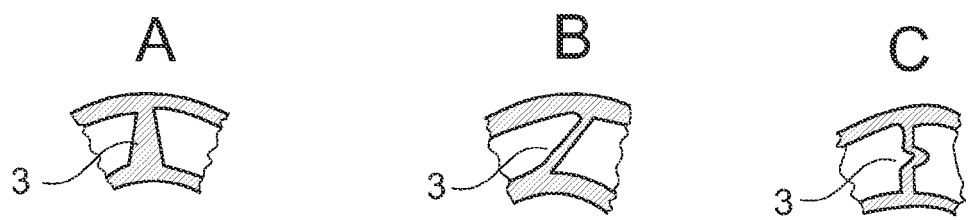
Figure 4:
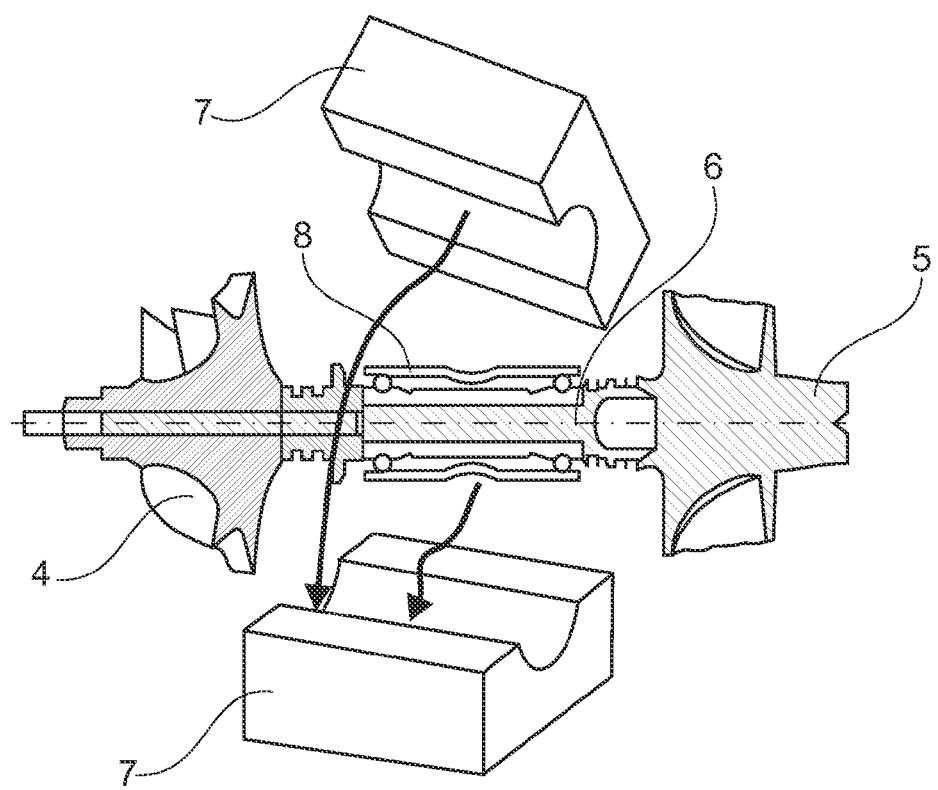
Figure 4:
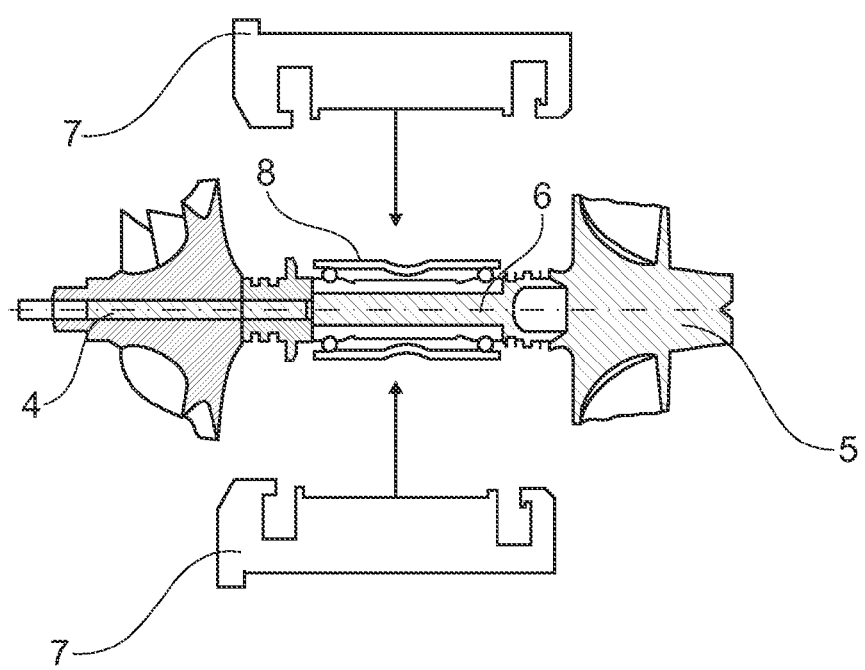
Figure 5:
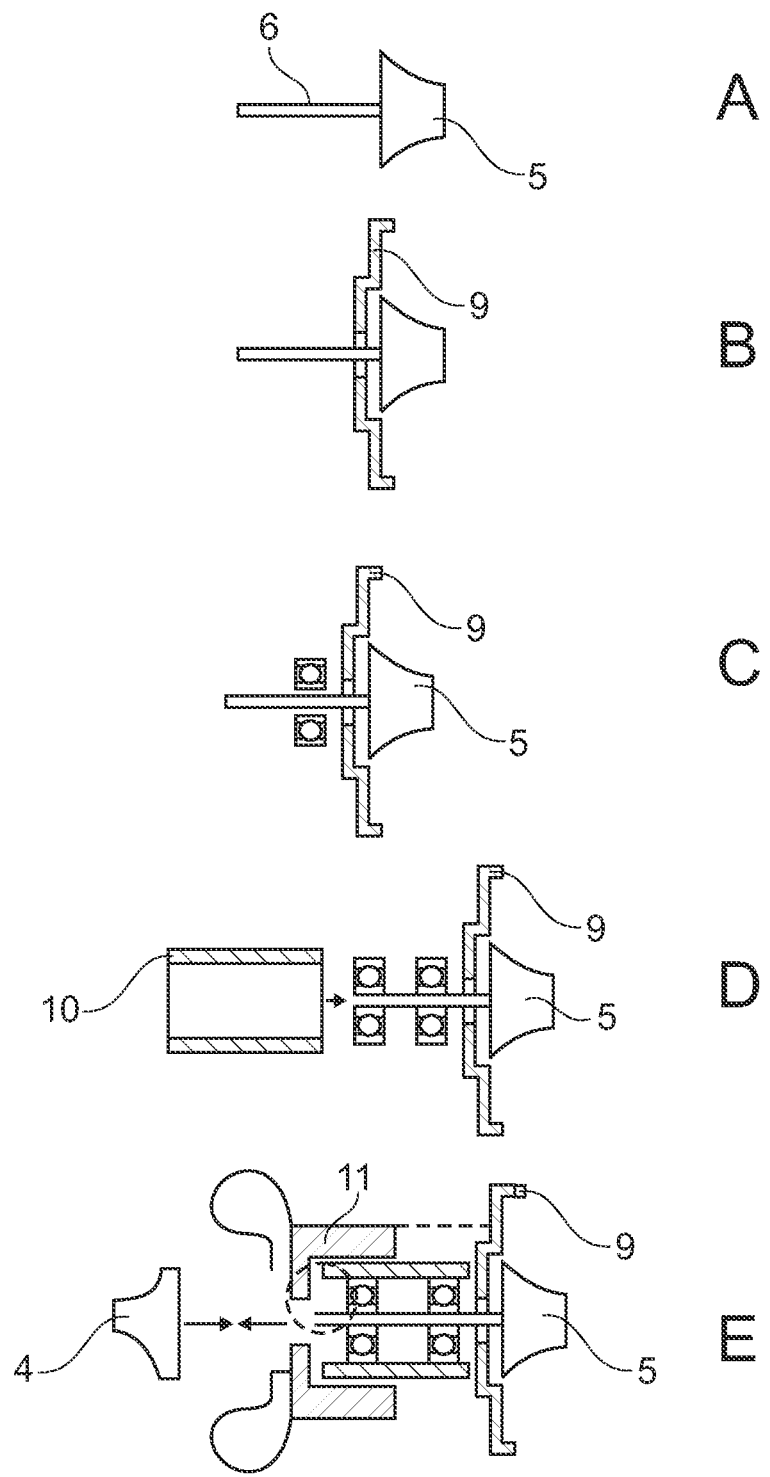
Figure 6:
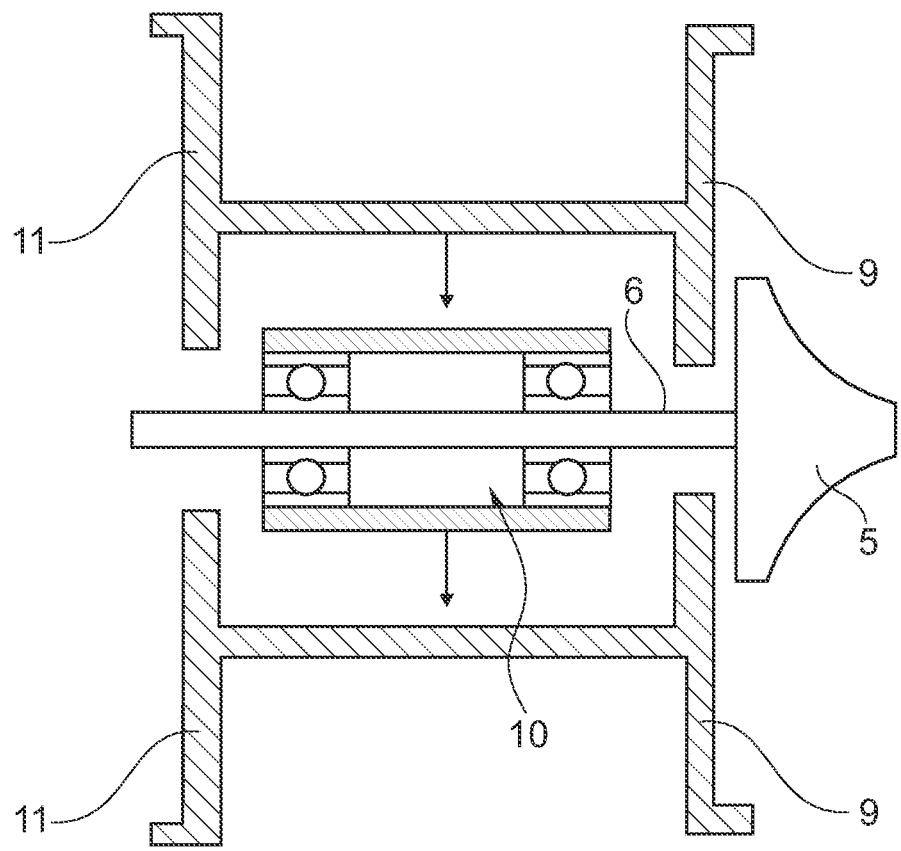

FIG. 1 a first rotary bearing arrangement according to the invention,

FIG. 2 a further rotary bearing arrangement according to the invention,

FIG. 3 various versions of the rotary bearing arrangement according to FIG. 2,

FIG. 4 a rotary bearing arrangement for the rotor of a turbocharger,

FIG. 5 the assembly of an embodiment modified with respect to FIG. 4, wherein all substantial assembly steps are effected in axial direction relative to the rotor shaft, FIG. 6 a further advantageous possibility for the arrangement and embodiment of the rotary bearing arrangement of the rotor of a turbocharger.

In the exemplary embodiment of FIG. 1 a tubular metal sleeve 1, which accommodates a rotary bearing arrangement, is arranged within a plastic bushing 2. This plastic bushing 2 can be created in a plastic injection molding process through over-molding of the metal sleeve 1, which accordingly enters into a material connection with the plastic bushing 2 produced in this manner. According to a first version of the invention the metal sleeve 1 can form the outer race of at least one slide or rolling bearing or enclose the outer race or the outer races of such a bearing in a fixed manner. With the plastic bushing 2 the metal sleeve 1 is arranged and held within a corresponding receiving bore of a housing body 7, wherein then the plastic sleeve 2 prevents an undamped transmission of structure-borne vibration from the rotary bearing to the housing body. The sleeve 1 can enclose the outer races of several rotary bearings so that the bearings are coaxially aligned via the sleeve 1.

If applicable, the outer race of a rolling bearing can also be arranged within the metal sleeve 1 subject to the interposition of an oil pressure gap. The measures for the rotation and displacement safeguard of the outer race necessary in this case can then be designed or arranged principally in any manner between the outer race and the metal sleeve 1, wherein such safeguards if applicable may also act as sound bridges for structure-borne vibration. An undesired transmission of structure-borne vibration to the housing body 7 enclosing the plastic bushing 2 is prevented by the plastic bushing 2.

According to FIG. 2, the plastic bushing 2 can be designed in the manner of a double-wall tube between the inner and outer wall of which ribs 3 or the like are arranged. FIG. 3 illustrates different possibilities of the arrangement of the ribs 3. In Figure A the ribs 3 each extend in a plane including the longitudinal axis of the bushing 2. In Figure B, the ribs are inclined relative to such an axial plane. According to Figure C, the ribs can each have a leg spring-like bulge, so that the ribs can be resiliently compressed or extended in radial direction. With this arrangement, the inner tube of the double-wall tube forms a mounting for the outer race of the rolling bearing and the ribs as well as the outer tube of the double-wall tube form a sound-damping holding device of the mounting.

Within the plastic bushing 2 or the double-wall tube 2 the metal sleeve 1 or the outer race of the slide or rolling bearing can be arranged subject to the interposition of an oil pressure gap. FIG. 2 shows feed openings 2' and 2" for the oil of the oil pressure gap.

FIG. 4 now shows a particularly advantageous type of the arrangement of rotary bearings in the housing of a turbocharger.

According to FIG. 4 it is provided to prefabricate a rotor of a turbocharger consisting of a compressor wheel 4, a turbine wheel 5 and a shaft 6 connecting these two wheels 4 and 5 in a rotationally fixed manner completely with the rotary bearing arrangement of the shaft 6 and then to insert said rotor in an associated housing body 7, which with respect to an axial plane containing the axis of the shaft 6, is divisible. Here, the assembly of compressor wheel 4 and turbine wheel 5 as well as the shaft 6 can be effected in such a manner that the shaft 6 is initially connected to the turbine wheel 5. After this, a major temperature differential is established between the inner race of the bearing arrangement 8 and the shaft 6 so that the outer diameter of the shaft 6 relative to the inner diameter of the inner race is reduced and the shaft 6 can be axially slid into the inner race. Upon the subsequent temperature balancing of shaft 6 and inner race of the bearing arrangement 8 the diameter of the shaft 6 increases relative to the inner diameter of the inner race of the bearing arrangement 8 so that the inner race is fixed on the shaft 6 with a press fit. Following this, the free end of the shaft 6 is connected to the compressor wheel 4. The assembly of the rotor outside the turbocharger housing and the arrangement of the rotor with preassembled bearing arrangement 8 in a split housing body 7 offers substantial advantages during the manufacture, particularly when comparatively complicated rolling bearing arrangements according to FIGS. 1 to 3 are provided or are desirable. It is particularly advantageous here that a particularly reliable adjustment of the bearing preload is made possible. The outer race of the bearing arrangement 8 is preferentially encased by a tubular mounting (not shown) which consists of a material with poor sound conductance or is designed for poor sound conductance.

FIG. 5 shows a further highly advantageous possibility of the assembly of a rotary bearing arrangement of a rotor/of a turbocharger in the turbocharger housing.

As is shown in Figure A of FIG. 5, the turbine wheel 5 is initially materially connected to the rotor shaft 6, typically through welding.

After this, the rotor shaft 6 according to Figure B is axially slid through the central opening of a flange 9 on the turbine end of the turbocharger housing which is not shown in any detail here. This housing is preferentially segmented in such a manner that the flange 9 separable from the remaining housing is obtained.

According to the Figures C and D the rotary bearings of the shaft 6 are now mounted on said shaft, which bearings are subsequently accommodated by a bushing 10 so that the rotary bearings with the bushing 10 form a bearing cartridge.

According to Figure E, a housing element 11 which is to accommodate the bearing cartridge formed by the bushing 10 with the rotary bearings subject to the interposition of an oil pressure gap that can be connected to the flange 9 is axially slid over the bushing 10 subject to the utilization of the annular spacing provided for the oil pressure gap and connected to the flange 9. In the process, substantially diametrically opposed parts for anti-rotation protection of the bearing cartridge arranged on the bushing 10 and in the housing segment 11 positively engage with one another. These anti-rotation protection parts not shown in any detail in the drawings are practically designed so that they dampen a structure-borne vibration transmission between bushing 10 and housing segment 11 which is otherwise possible. According to the invention, this is ensured for example in that the parts provided for the anti-rotation protection consist of plastic or another vibration-damping material at least in certain regions.

The free end of the rotor shaft 6 now protruding from the housing segment 11 can now be positively and/or non-positively connected to the compressor wheel 4 for example through screw connection. Following this, the turbocharger housing which is not shown in more detail here, is completed.

FIG. 6 shows an alternative design. Here, the housing segment 11 is divisible with respect to a plane containing the longitudinal axis of the rotor shaft 6 so that the bearing cartridge 10 previously mounted on to the rotor shaft 6 can be radially sunk into a half of the housing segment 11. After this, the other half of the housing segment 11 is mounted.

With this design, the housing flange 9 on the turbine wheel end is practically split in the same manner as the housing segment 11, so that following unifications of the two halves of the housing segment 11 the flange 9 on the turbine wheel end is also completely assembled.

In principle, however, the complete flange 9 on the turbine wheel end can also be designed as a separate housing part and following unification of the halves of the housing segment 11, can be connected to the housing segment 11.

The bearing cartridge 10 of FIGS. 5 and 6 is preferentially arranged in a mounting (not shown) which in the assembled state of the housing 11 forms a barrier hindering the propagation of sound vibrations. This barrier can be unitarily designed with the housing segment 11.

The invention claimed is:

1. A rotary bearing, comprising:
   an inner race; and
   an outer race, wherein the races are configured between a rotor and a housing body, wherein a mounting surrounding an outer race sleeve is at least one of clamped and fixed in a predetermined position on the housing body by at least one of a holding device and a locking device of a material damping structure, and the at least one of the holding device and the locking device is designed as a double-wall tube.

2. The rotary bearing arrangement according to claim 1, wherein the mounting encloses the outer race subject to the interposition of an oil pressure gap.

3. The rotary bearing according to claim 1, wherein at least one of the holding device and the locking device has a longitudinal axis with at least one of connections and ribs extending in a plane including the longitudinal axis and arranged between the walls, and the mounting is fixedly connected to the inner circumference of the inner wall.

4. The rotary bearing according to claim 3, wherein at least one of a gel and foam-like intermediate carrier is arranged between the walls.

5. The rotary bearing according to claim 3, wherein at least one of a plastic bushing and the double-wall tube is unitarily formed with a compressor housing of plastic.

6. The rotary bearing according to claim 1, wherein at least one section of the housing body accommodating the rotary bearing arrangement is divisible with respect to a plane containing the bearing axis.

7. The rotary bearing according to claim 6, wherein the housing body forms at least one part of the housing of a turbocharger and the rotary bearing arrangement mounts the rotor of the turbocharger.

8. The rotary bearing according to claim 1, wherein at least one of the housing body and a section of the housing body accommodates the outer race mounting of the rotary bearing arrangement subject to the interposition of an oil pressure gap.

9. The rotary bearing according to claim 8, wherein the housing section enclosing the rotary bearing arrangement is divisible with respect to a plane that is orthogonal with respect to the rotor axis.

10. The rotary bearing according to claim 9, wherein the housing section is divisible into a flange that is substantially orthogonal to the rotor axis and a housing body part axially accommodating the outer race mounting subject to the interposition of an oil pressure gap.

11. The rotary bearing according to claim 1, wherein the double-wall tube has a plurality of feed openings for providing an oil pressure gap.

12. A turbocharger rotary bearing, comprising:
an inner race; and
a sleeve like outer race configured between a rotor shaft and a housing body of a turbocharger, a mounting surrounding the outer race is at least one of clamped and fixed in a predetermined position on the housing body by at least one of a holding device and a locking device of a material vibration damping structure, and the at least one of the holding device and the locking device is designed as a double-wall tube.

13. The rotary bearing according to claim 12, wherein the double-wall tube has a plurality of feed openings for providing an oil pressure gap.

14. The turbocharger rotary bearing arrangement according to claim 12, wherein the mounting encloses the outer race subject to the interposition of an oil pressure gap.

15. The turbocharger rotary bearing according to claim 12, wherein at least one of the holding device and the locking device has a longitudinal axis with at least one of connections and ribs extending in a plane including the longitudinal axis and arranged between the walls, and the mounting is fixedly connected to the inner circumference of the inner wall.

16. The turbocharger rotary bearing according to claim 15, wherein at least one of a gel and foam-like intermediate carrier is arranged between the walls.

17. The turbocharger rotary bearing according to claim 12, wherein at least one section of the housing body accommodating the rotary bearing is divisible with respect to a plane containing the bearing axis.

18. The turbocharger rotary bearing according to claim 12, wherein at least one of the housing body and a section of the housing body accommodates the outer race mounting of the rotary bearing arrangement subject to the interposition of an oil pressure gap.

19. The turbocharger rotary bearing according to claim 18, wherein the housing section enclosing the rotary bearing arrangement is divisible with respect to a plane that is orthogonal with respect to the rotor axis.

20. The turbocharger rotary bearing according to claim 19, wherein the housing section is divisible into a flange that is substantially orthogonal to the rotor axis and a housing body part axially accommodating the outer race mounting subject to the interposition of an oil pressure gap.

* * * * *